INVENTOR.
ANTHONY R. CHASAR
BY Meyer, Baldwin, Doran & Egan
ATTORNEYS

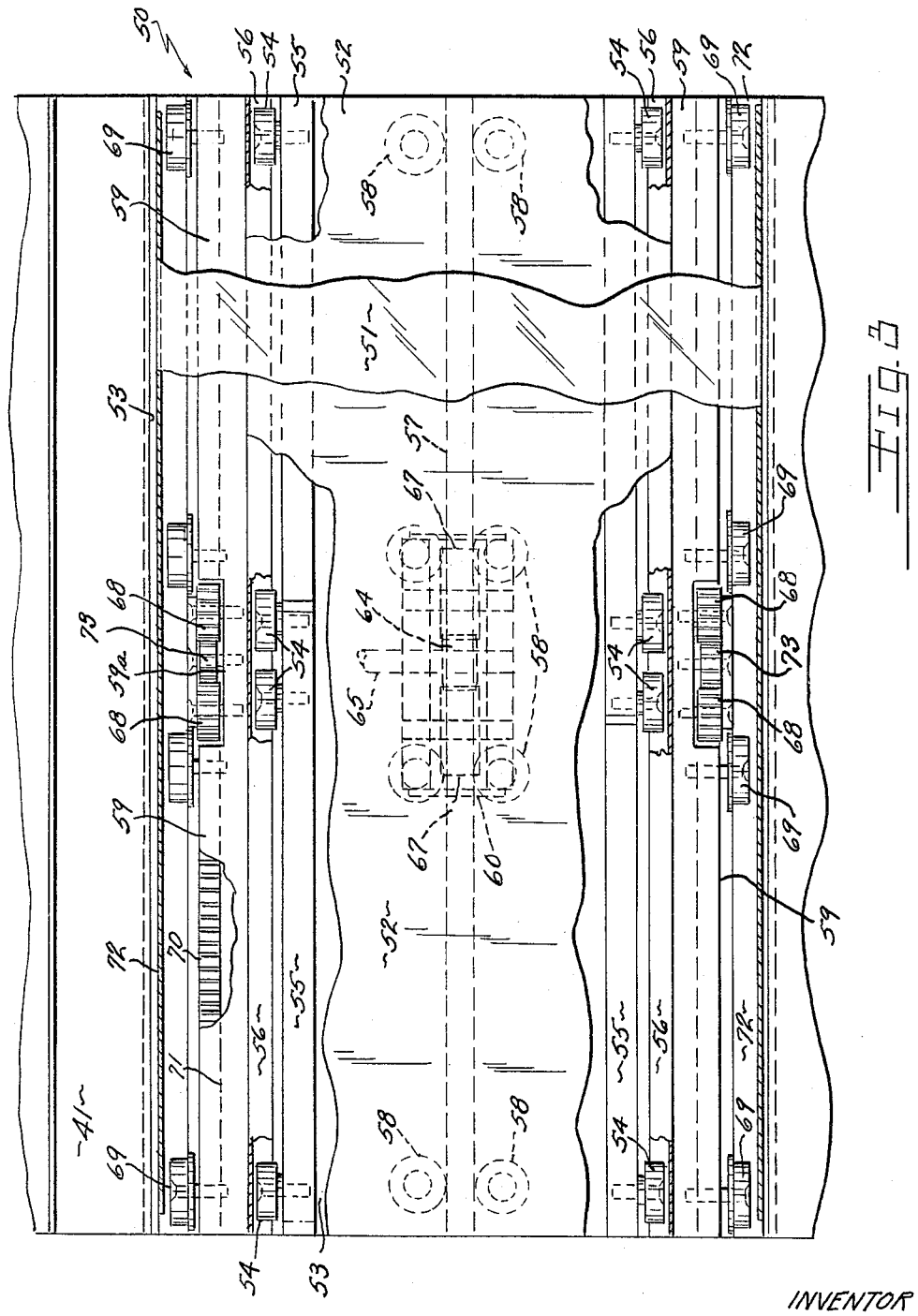

Nov. 8, 1966 A. R. CHASAR 3,283,924
EXTRACTOR APPARATUS WITH CURVED GUIDES
Filed June 9, 1965 5 Sheets-Sheet 3

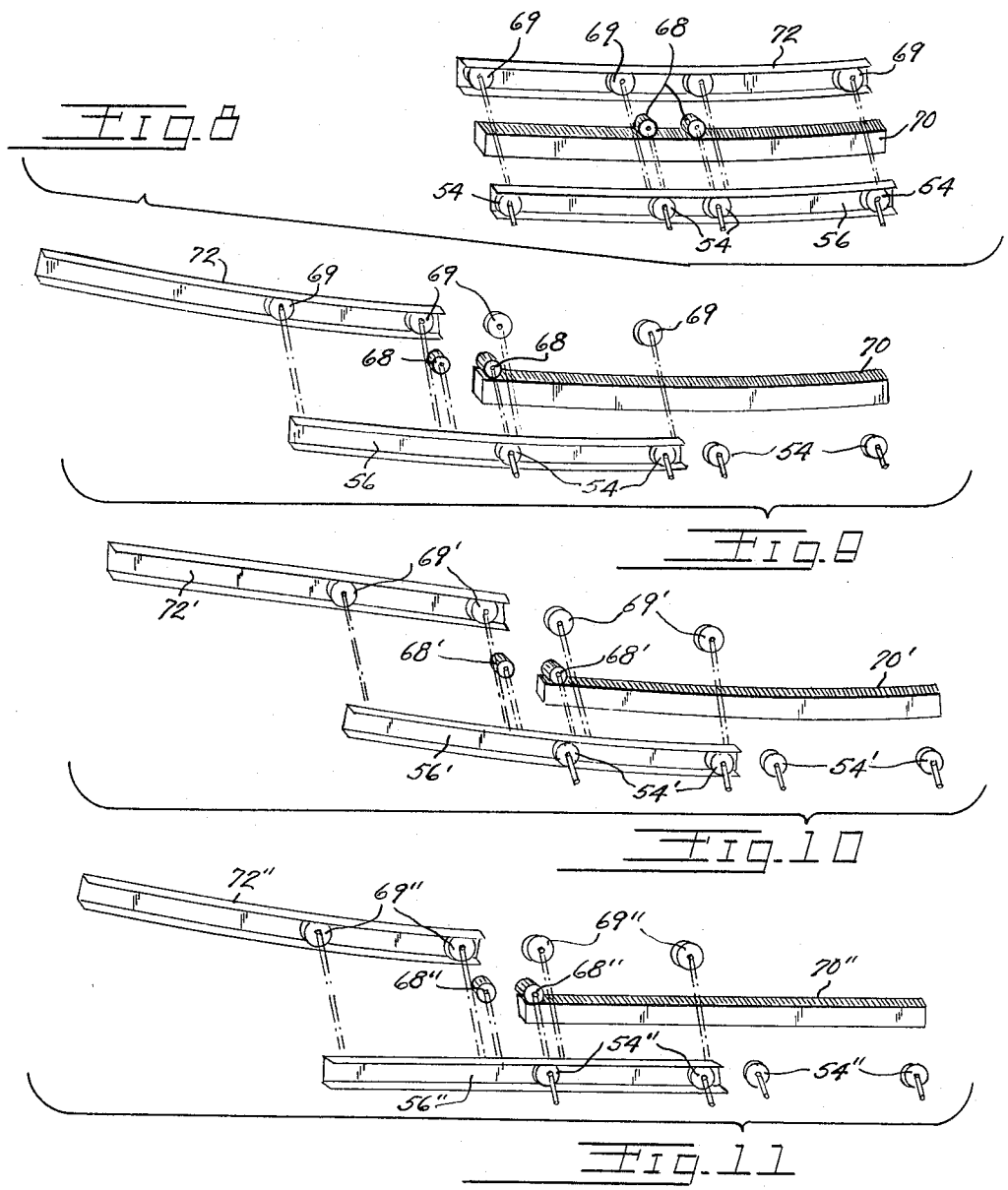

Nov. 8, 1966  A. R. CHASAR  3,283,924

EXTRACTOR APPARATUS WITH CURVED GUIDES

Filed June 9, 1965  5 Sheets-Sheet 5

United States Patent Office 3,283,924
Patented Nov. 8, 1966

3,283,924
EXTRACTOR APPARATUS WITH CURVED GUIDES
Anthony R. Chasar, Columbiana, Ohio, assignor to The Triax Company, Cleveland, Ohio, a corporation of Ohio
Filed June 9, 1965, Ser. No. 462,532
16 Claims. (Cl. 214—16.4)

This invention relates to vertically movable carriage means in a mechanized warehousing system and particularly to a laterally extendible, cantilever extractor for transferring a load between the carriage means and a load support of a storage frame.

An example of a warehousing system to which the present invention may be applied comprises a storage frame having a plurality of vertically continuous bays opening at an aisle disposed alongside the storage frame. The storage frame has load supports which comprise horizontal ledges disposed transversely of the aisle and carried in pairs on opposite side portions of the bay at different levels whereby loads can be bridged thereacross. The vertically movable carriage is carried by a horizontally movable carrier whereby said carriage can be disposed in alignment with a selected bay. When so aligned, the vertically movable carriage is elevated to the approximate level of a load support, and the extractor is cantilevered laterally into the selected bay for picking up or depositing a load at a selected load support. The extractor is narrower than the distance between the ledges whereby it can be projected into a bay and moved vertically between the ledges to either pick up a load at a selected load support or deposit a load thereat. In the form of the invention herein illustrated, the storage frame bridges the aisle and provides transversely aligned bays and load supports on either side of the aisle, and the extractor is adapted to extend out of the aisle into a bay on either side of said aisle.

In a laterally extendible, cantilever extractor of the type referred to, there is a tendency for the extractor to sag or be deflected downwardly in its extended position. This sag or deflection is particularly accentuated when the extractor is loaded. It is a primary object of this invention to provide a laterally extendible extractor which automatically compensates for the above referred to downward deflection when it is extended.

Another object of this invention is to provide an extractor having a laterally movable frame mounted upon a carriage by guide means, said guide means including upwardly displaced surface portions for causing the frame to angle upwardly as it moves laterally.

A further object is to provide an extractor of the above type having a base and a laterally movable frame one of which carries curved channel means and the other of which carries interfitting rollers for causing the frame to tilt upwardly as it moves outwardly.

Another object of this invention is to provide a cantilever extractor having telescoping inner and outer frames at least one of which is provided with guide means and guide follower means which are curved upwardly at the ends to cause the extractor to normally assume a slightly upwardly directed angle when it is extended.

Still another object is to provide such a cantilever extractor wherein both of the frames are provided with guide means and guide follower means which are directed upwardly at the ends.

Yet another object is to provide an extractor as set forth above which normally tends to angle upwardly when extended in either transverse direction out of the aisle into a storage bay.

Other objects of the invention will be readily apparent from the following description of five embodiments thereof as illustrated in the accompanying drawings.

FIG. 1 of the drawings is an end view of a mechanized warehousing system incorporating a first embodiment of the cantilever extractor of this invention.

FIG. 3 is an enlarged top plan view of the extractor of this invention, parts of said extractor being cut away.

FIG. 4 is an end view of the extractor in FIG. 3.

FIG. 5 is a section taken along the line 5—5 of FIG. 4.

FIG. 6 is a section taken along the line 6—6 of FIG. 4.

FIG. 7 is a section taken along the line 7—7 of FIG. 4.

FIG. 8 is an exploded view of parts of the mechanism for extending the extractor laterally, the parts being shown in the retracted position.

FIG. 9 is an exploded view showing the parts of FIG. 8 in the extended position.

FIG. 10 is a view similar to FIG. 9 showing a second embodiment directed to the mechanism for extending the extractor laterally.

FIG. 11 is a view similar to FIGS. 9 and 10 showing a third embodiment directed to the mechanism for extending the extractor laterally.

Figure 1:
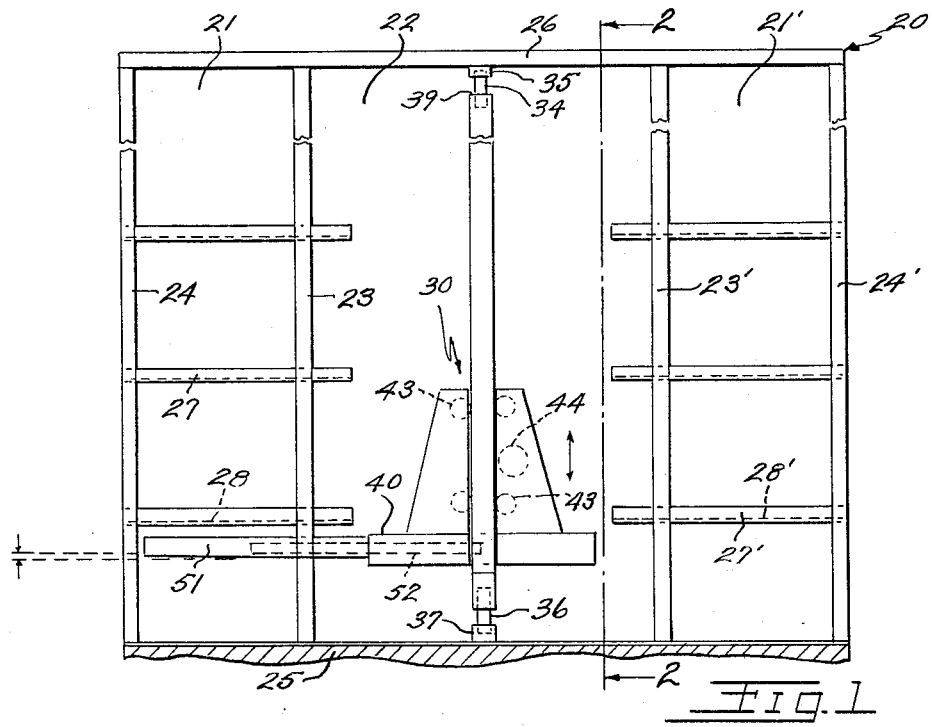
Figure 2:
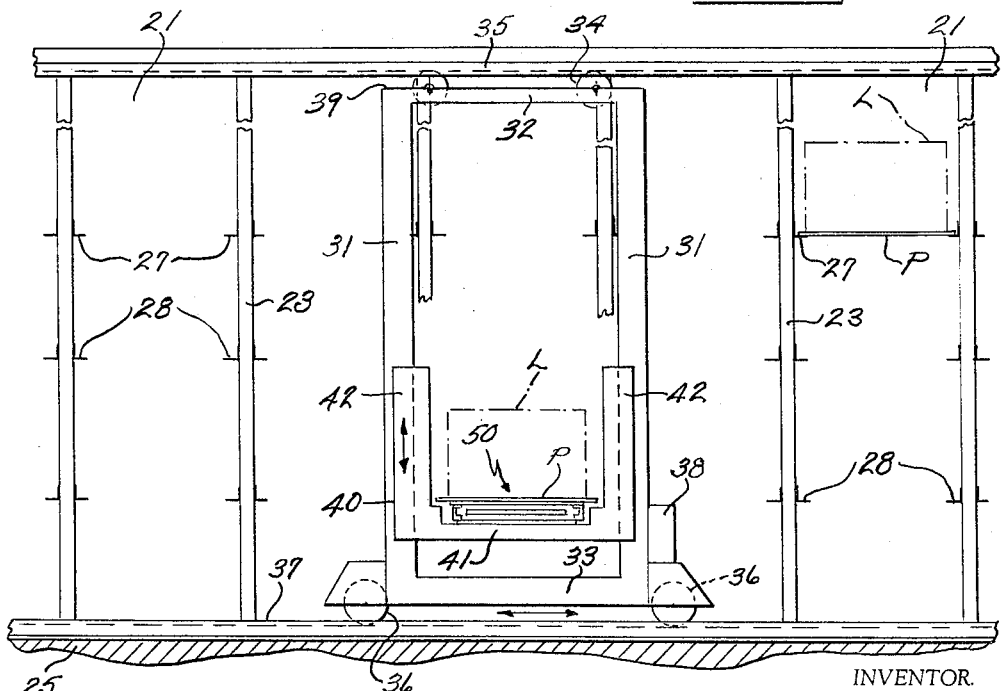
FIG. 2 is a side elevation as seen from the line 2—2 of FIG. 1.

Referring now to the drawings and particularly to FIGS. 1 and 2, the warehousing system illustrated comprises a storage frame 20 having a plurality of storage bays 21 and 21' arranged along either side of an aisle 22. The bays 21 and 21' are defined by parallel rows of aisle posts 23 and 23', disposed adjacent to said aisle, and corresponding, transversely aligned, parallel rows of outer posts 24 and 24'. All of the posts are mounted at their lower ends upon a suitable base surface or floor 25, and laterally or transversely aligned aisle and outer posts are connected together and across the aisle 22 by transverse members 26.

As best shown in FIG. 2, the bays 21 and 21' are open throughout their vertical height, and loads are mounted therein at different levels by bridging the loads across the flanges of pairs of angle members 27 or 27'. Each angle member 27 or 27' is disposed horizontally transverse to the direction of the aisle 22 and is connected to a pair of aligned aisle and outer posts 23 and 24 or 23' and 24', respectively, in such manner that one flange thereof projects inwardly of the bay. Each pair of horizontally aligned angle members projecting into the same bay provides a load support 28 or 28' which is adapted to carry a load such as that shown in broken lines at L. The loads L are preferably carried upon pallets P whereby they are provided with uniform base or bottom dimensions for storing purposes and whereby the loads themselves may vary in size and shape if so desired.

A load transfer apparatus 30 is provided in the aisle 22 for moving loads both vertically and horizontally within the aisle to the different levels of the load supports 28 and 28' and to the horizontal positions of the bays 21 and 21'. The transfer apparatus comprises a pair of vertical masts 31 connected across the top by an end member 32 and across the bottom by a base structure 33. The masts 31 are disposed along the center-line of the aisle 22 and are spaced apart in the direction of said aisle. The upper end member 32 is preferably provided with wheels or rollers 34 for rolling engagement with an overhead track or guide 35 carried by the transverse members 26. Similarly, the base structure 33 is provided with wheels or rollers 36 for rolling engagement with a base rail or track 37. One of the wheels 36 is preferably power driven for driving the transfer apparatus 30 horizontally along the aisle, such means being a motor and gear means of any suitable type, indicated at 38.

The masts 31, the end member 32, and the base structure 33 constitute a horizontally movable frame 39 upon which is mounted a vertically movable carriage 40. The carriage 40 comprises a base 41 having uprights 42 at either side thereof, said uprights being disposed in planes which are transverse with respect to the aisle 22. The uprights 42 are disposed between and partially embrace the masts 31 and provide mounting means for rollers 43 which engage said mast for movement of the carriage vertically therealong. A suitable motor 44 is preferably connected to drive one of the rollers 43 although it will be readily understood that the carriage 40 may be moved vertically in any one of a number of suitable ways.

Referring now to FIGS. 3–7, the carriage 40 has a laterally movable extractor 50 which comprises an outer, upper frame 51 and an inner, lower frame 52. The inner frame 52 is adapted to be driven laterally out of the carriage 40 in either direction transverse to the aisle 22 with the outer frame 51 being driven outwardly ahead of said inner frame in the manner illustrated in FIG. 1. Interfitting guide means comprising guide and guide follower means control the motions of the frames and maintain them in a nested and telescoped relationship.

The extractor 50 is carried generally within a recess 53 of the base 41, the recess in said base comprising a broad, U-shaped channel disposed transversely of the aisle 22 and opening at either side of the carriage 40. Within the recess 53, said base carries guide means in the form of two rows of axially horizontal inner rollers 54 mounted to said base by a pair of elongated roller mounting bars 55. Each row of rollers 54 as herein illustrated comprises two closely associated middle rollers and two outwardly spaced end rollers, and said rows are disposed substantially inwardly from the edges of the recess 53 on the outer sides of said mounting bars. The inner frame 52 extends over the rows of rollers 54 and carries guide follower means at its edges in the form of channel members 56 which engage the rows of rollers 54 to afford guided movement of said inner frame in either direction transversely of the aisle 22.

The central portion of the inner frame 52 is depressed and carries on its lower side a rack 57 which is directed transversely of the aisle 22. A plurality of axially vertical rollers 58 carried by the base 41 are disposed in parallel rows on either side of the rack 57 to guide and stabilize said rack and the inner frame 52 as said rack and frame move transversely of the aisle.

A gear housing 60 (FIG. 5) is mounted within a suitable aperture 61 in the base 41 and projects just below the center of the rack 57, said gear housing having mounting ears 62 secured to said base by nut and bolt assemblies 63. Said gear housing 60 houses a drive pinion 64 which is driven by a drive shaft 65 of a motor and transmission means indicated at 66. The motor and transmission means 66 is carried by one of the uprights 42 at one end of the carriage 40, and the drive shaft 65 and drive pinion 64 are disposed axially parallel with the aisle 22 substantially centrally of the recessed base 41.

The drive pinion 64 engages a pair of gears 67 which are disposed on either side of said pinion and which said gears are mounted in the gear housing 60 to mesh with the rack 57. The motor and transmission means 66 is reversible, and it will be readily understood that when the drive shaft 65 rotates, the inner frame 52 is driven transversely of the aisle out of the carriage 40 in one lateral direction through the drive pinion 64 and the pair of gears 67. As best seen in FIG. 5, it will be noted that the gears 67, being spaced transversely from the drive shaft 65, allow the rack 57 and the inner frame 52 to be displaced beyond the pinion 64 in either transverse direction without having said rack disengaged from its driving means. Thus, a greater movement is afforded to the inner frame 52 than would otherwise be possible if said inner frame were driven directly by the drive pinion 64 engaging the rack 57.

As best shown in FIGS. 3 and 4, the channel members 56 have elongated roller mounting bars 59 welded or otherwise suitably secured thereto which said bars 59 each carry both a pair of idler pinions 68 (FIG. 6) and guide means in the form of a plurality of outer rollers 69. As best shown in FIG. 3, the central portion of each bar 59 is laterally recessed at 59a to accommodate the idler pinions 68, with the rollers 69, arranged in a manner similar to the inner rollers 54, being carried on the outer vertical sides of said bars. The idler pinions 68 engage lower racks 70 carried by the base 41, the upper peripheries of said pinions meshing with and supporting upper racks 71 mounted to the underside of the outer frame 51. Said outer frame carries guide follower means in the form of U-shaped channel members 72 which engage the rollers 69 for rolling movement relative to the inner frame 52. As shown in FIG. 6, each pair of idler pinions 68 are connected in a train with a smaller, intermediate idler pinion 73 thereby affording increased transverse movement of the outer frame 51 by allowing greater movement of the racks 71 in either transverse direction without causing said racks to become completely disengaged from said idler pinions.

The extractor 50 operates in the following general manner. The motor and transmission means 66 drive the inner frame 52 substantially halfway or more out of the recessed base 41. This causes the idler pinions 68 to roll along the lower racks 70, such motion driving the outer frame 51 ahead of said inner frame by engagement of said idler pinions with the upper racks 71. Thus, if the inner frame 52 is driven substantially halfway out of the recessed base 41, the outer frame 51 will overrun the inner frame and be driven or extended substantially all the way out of the carriage 40, as shown in FIG. 1, because it travels twice the distance of said inner frame. It will be readily understood that such a construction need not be limited to only one overrunning outer frame.

Referring now to FIGS. 5–9, the extractor 50 is capable of being fully extended in either lateral direction because of its symmetrical construction transversely of the aisle 22, and when so extended in either direction is caused to normally tilt or angle obliquely upwardly a slight distance. This upward angling or tilting is caused by a slight bow or curve which is provided in each of the relatively movable parts of the extractor. This bow or curve is downwardly concave whereby the ends of the frames, channel members, and racks are disposed upwardly with respect to their central portion. For example, it will be noted in FIG. 7 that the inner channel members 56 are provided with a curve, bow, or slight V-shape as seen in side elevation and that the inner frame 52, which is preferably welded to the upper flanges of said channel member 56, is also slightly bowed downwardly. To accommodate to this bowed effect, the endmost rollers 54 are upwardly offset slightly with respect to the inner rollers 54 whereby the points defined by the axes of all of said inner rollers define a bow or arc substantially identical with that of the channel members 56.

It will be readily understood that as the inner frame 52 and associated channel members 56 move laterally or outwardly of the vertically movable carriage 40, said frame and members move outwardly and upwardly at the outer end thereof. This is clearly shown in FIG. 9 where a channel member 56 is shown in the extended position in engagement with only one outer roller 54 and one inner roller 54. The lowest part of the channel member 56, which is toward the middle thereof, engages a higher, outer roller 54 whereas the nonextended end portion of said channel member, which is normally one of the higher points thereof, is engaged by a lower positioned roller 54. Therefore, the outwardly extended end of each channel member 56 tends to project obliquely upwardly both because the channel member is bowed or curved upwardly at the ends and because that portion of each channel which remains in engagement with the rollers 54 is now on a tilt. Although it is preferred that the channels 56 define a portion of an arc, it will be readily understood that the same effect is attainable by causing them to be slightly V-shaped in side elevation or slightly bent or curved in the mid-portion thereof whereby the ends are raised.

As hereinabove described, the mounting bars 59 for carrying the outer rollers 69 and idler pinions 68 are carried by the inner channel members 56. The mounting bars 59 may be integral with said inner channel members or they may be separate bars welded to said inner channel members. In either event, the rollers 69 carried thereby are so mounted as to define an arc, bow or slight V identical with that of the associated channel members. This may be effected by bending each inner channel member 56 and its associated mounting bar 59 at the same time or by the positioning of the mounting holes for the rollers 69. The outer channel members 72 are also curved, bowed or V-shaped, as described above, to match the positions of the outer rollers 69. The outer frame 51 is preferably welded or otherwise suitably secured to the upper flanges of the outer channel members 72 whereby it also is slightly bent.

The upper racks 71 are bolted or otherwise suitably secured to the underside of the outer frame 51 and are sufficiently flexible to assume the shape of said outer frame. The lower racks 70 are bolted or otherwise suitably secured to the flat bottom of the recess 53 of the base 41 and are provided with shims 70a as needed (FIGS. 4 and 6) to provide proper tooth clearance and meshing with the idler pinions 68. Thus, the outer frame 51 will normally tend to angle upwardly with respect to the inner frame 52 as it moves outwardly therebeyond in the same manner that the inner frame 52 normally tends to angle relative to the base 41.

The amount of upward angling of the extractor 50 in the extended position can be varied by varying the degree of the bowing of the relatively movable parts of the extractor. Ideally, the amount of bowing is such that in the extended position under load, the downward deflection of the extractor will be exactly counteracted to the point where the load will be introduced into the storage frame in a substantially level position. This will obviously vary with the length of the extractor and the weight of the loads to be handled.

FIG. 10 shows a first modification of the extractor wherein only the inner channel members, the inner rollers, and the lower racks are bowed, curved or V-shaped. FIG. 10 shows a bowed inner channel member 56' in the extended position with respect to inner rollers 54' whose axes also are on a bowed or curved line. The channel members 56' carry idler pinions 68' which engage bowed lower racks 70' which may be shimmed at the ends thereof as hereinabove described. The channel members 56' also carry a plurality of rollers 69' which are mounted on a straight line and are engaged by straight outer channel members 72'. It will be understood, of course, that the inner channel members 56' carry an inner frame and the outer channel members 72' carry an outer frame as in the first form of the invention. In the form of FIG. 10, only the inner frame carried by the inner channel members 56' tilt, with the outer frame carried by the outer channel member 72' being level with respect to the inner frame but nonetheless tilted with respect to the base 41 of the vertically movable carriage 40. The resultant angularity of the outer frame would, in this form of the invention, depend entirely upon the angularly afforded to the inner frame.

FIG. 11 shows another modification which is just the reverse of that shown in FIG. 10. FIG. 11 provides straight inner channel members 56" carried by rollers 54" whose axes are on a straight, horizontal line. The inner channel members 56" carry idler pinions 68" which engage lower, straight racks 70" for straight line movement of the inner frame out of the vertically movable carriage 40. The inner channel members 56" also carry rows of rollers 69" whose axes define a curve or bow to receive or engage curved outer channel members 72".

In the form of the invention shown in FIG. 11, the outer frame which is carried by the outer channel members 72" tilts upwardly as it moves outwardly with respect to the inner channel members 56" which said inner channel members move outwardly in a straight line. The outer frame 51 would, of course, be curved or otherwise bent to the shape of the channel members 72", and the upper rack carried thereby (not shown in FIG. 11) would also be curved in the manner described in connection with the first embodiment and as specifically illustrated in FIG. 6. In the form of FIG. 11, the curvature or bend of the upper rack enables it to remain in proper mesh with the idler pinions 68" even though the outer frame and the outer channel member 72" are tilting as the extractor extends. In the form shown in FIG. 10, the upper racks 71 do not need to be curved but may merely tilt with respect to the lower rack as the outer frame is tilted.

The remaining two embodiments of the invention, illustrated in FIGS. 12–15, show applications wherein only one movable frame is provided for moving transversely of the aisle in either horizontal direction. Only those parts are shown and described which are necessary to an understanding of the difference between the first embodiment and the embodiments presently being discussed.

Figure 12:
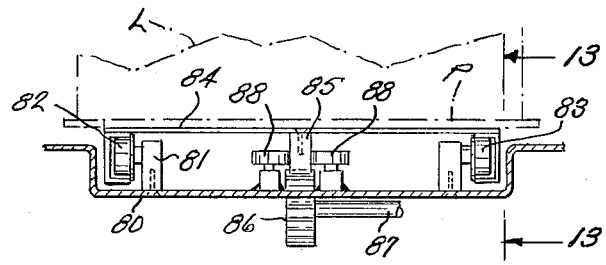
FIG. 12 is an end view of an extractor according to a fourth embodiment of the invention.
Figure 13:
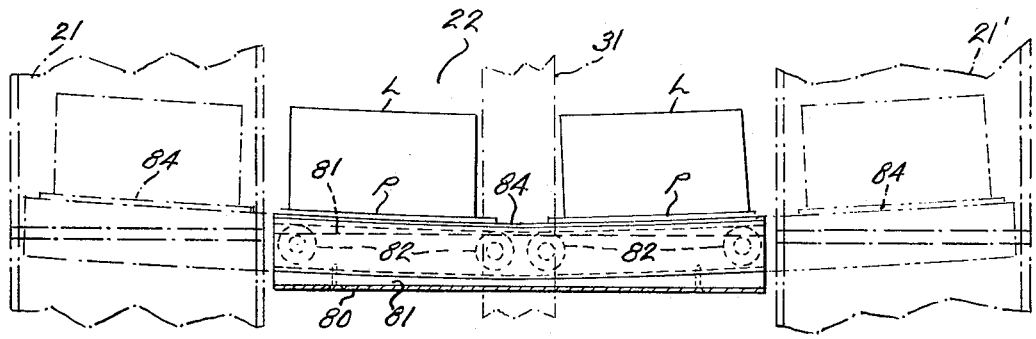
FIG. 13 is a section taken along the line 13—13 of FIG. 12.

In the embodiment of FIGS. 12 and 13, a base 80, which would be part of a vertically movable carriage such as that shown at 40 in the first embodiment, supports a pair of parallel roller mounting bars 81 disposed transversely of the aisle in the direction of intended movement of the extractor. Said roller mounting bars each carry a plurality of rollers 82 which are embraced or engaged by channel portions 83 of a movable frame 84. As shown in FIG. 13, the roller mounting bars 81 are each provided with four of the rollers 82, two of said rollers being disposed adjacent to each other in the middle of the associated bar and two of said rollers being spaced outwardly therefrom adjacent to the ends of the associated bar. The outermost of said rollers 82 are slightly raised and the channel portions 83 are correspondingly curved, V-shaped, or bent to accommodate said rollers. In the centered position, the channel portions 83 each engage or embrace all of the adjacent rollers 82, and the extractor is disposed symmetrically on either side of the masts 31 shown in broken lines.

The drive means for the frame 84 is substantially the same as that shown in the first embodiment and comprises a rack 85 carried on the lower surface of said frame 84 and engaged by gear means 86 driven by power shaft 87. Stabilizing rollers 88 carried by the base 80 maintain the rack 85 in mesh with the gear means 86 and hold the frame 84 in proper alignment with the rollers 82.

The frame 84 is movable laterally substantially one-half its length whereby one end of each channel portion 83 engages only one outer roller 82 and one inner roller 82. This causes approximately one-half of the frame to project laterally into either a storage bay 21 on one side of the aisle 22 or a bay 21' on the other side of the aisle. In this embodiment, the frame 84 provides space for two loads L carried by pallets T, one disposed on either side of the masks 31. The load on the left as shown in FIG. 13 would be movable into or out of a storage bay 21, and the load on the right would be movable into or out of a bay 21'. In either event, the curvature or bend in the channel portions 83, in cooperation with the rollers 82, cause the outwardly moving end of the extractor to move slightly upwardly as it moves into the storage area. Thus, downward deflection of the cantilevered extractor is effectively offset as in the first embodiment of the invention.

Figure 14:
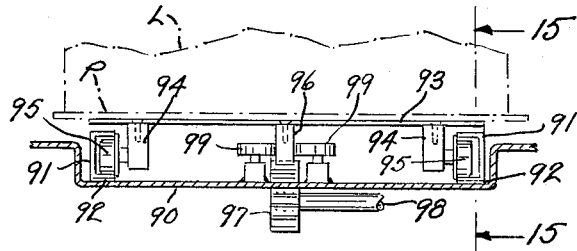
FIG. 14 is an end view of an extractor according to a fifth embodiment of the invention.
Figure 15:
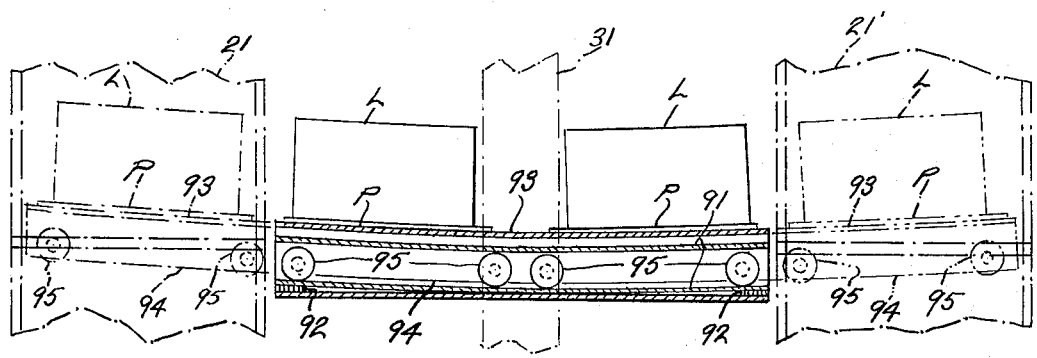
FIG. 15 is a section taken along the line 15—15 of FIG. 14.

The embodiment of FIGS. 14 and 15 illustrates a reversal of parts with respect to the embodiment of FIGS. 12 and 13 wherein the same effect is achieved of causing the extractor to move upwardly as well as outwardly when depositing or picking up a load. In this instance, a base 90 of the vertically movable carriage supports a pair of parallel channels 91 which are curved, bowed, or V-shaped as described above and which may be provided with shims 92 at the ends thereof as needed. A laterally movable frame 93 carries parallel roller mounting bars 94 at the lateral edges thereof adjacent to the inner, open sides of the channels 91. Each roller mounting bar 94 carries two inner and two outer rollers 95 positioned in the same manner as the rollers 82 in FIGS. 12 and 13. Drive means for the frame 93 is provided, as before, in the form of a rack 96 engaging gear means 97 driven by a power shaft 98, said rack traveling between stabilizing rollers 99.

As shown in FIG. 15, the frame 93 moves laterally in either direction to a point where only one inner and one outer roller 95 of each roller mounting bar 94 still engage the relatively fixed channels 91. In this way, either of two loads which can be carried simultaneously by the frame 93 can be projected into a storage bay 21 or 21'. It is anticipated that the number of rollers 82 or 95 need not be restricted to four, it only being necessary that two of said rollers of each roller mounting bar remain engaged with its associated channel portion or channel.

As herein before expressed, the purpose of tilting the extractor upwardly as it moves outwardly is to offset the tendency of said extractor to deflect downwardly when it is extended, particularly under load. This downward deflection results from necessary operating clearance between the rollers 43 and the masts 31, deflection of the masts under load, and wear between the different engaging and relatively movable surfaces, rollers and teeth. By causing a slight upward movement as the extractor extends, this inherent tendency to deflect downwardly is offset whereby the load is maintained substantially level when moved by the extractor.

It will be understood that many changes in the details of the invention as herein described and illustrated may be made without, however, departing from the spirit thereof or the scope of the appended claims.

What is claimed is:

1. In a mechanized warehousing system, a vertically movable carriage for moving loads to different storage levels; a load transferring extractor mounted to said carriage for projecting horizontally outwardly from said carriage; said extractor comprising relatively movable frames; first interfitting guide means connecting said carriage with a first of said frames; second interfitting guide means connecting said first frame with a second of said frames; means for driving said first frame outwardly; means for driving said second frame outwardly ahead of said first frame; and one of said guide means having upwardly turned surface portions causing one of said first and second frames to tilt upwardly as it projects outwardly.

2. In a mechanized warehousing system, a vertically movable carriage for moving loads to different storage levels; a load transferring extractor mounted to said carriage for projecting horizontally outwardly from said carriage; said extractor comprising relatively movable frames; first guide means fixedly carried with respect to said carriage; first guide follower means fixedly carried with respect to one of said frames and engaging said first guide means; second guide means fixedly carried with respect to said one frame; second guide follower means fixedly carried with respect to another said frame and engaging said second guide means; at least one of said means having relatively upwardly and downwardly displaced guide surface portions engaging the means associated therewith and causing one of said frames to tilt upwardly as it projects outwardly; means for driving said one frame outwardly; and means for driving said other frame outwardly ahead of said first frame.

3. In a mechanized warehousing system, a vertically movable carriage for moving loads to different storage levels; a load transferring extractor mounted to said carriage for projecting horizontally outwardly from said carriage; said extractor comprising inner and outer, relatively movable frames; first guide means carried by said carriage; first guide follower means carried by said inner frame and engaging said first guide means; second guide means carried by said inner frame; second guide follower means carried by said outer frame and engaging said second guide means; said first guide follower means having relatively upwardly and downwardly displaced guide surface portions engaging said first guide means and causing said inner frame to tilt upwardly at its forward end as it projects outwardly thereby causing said outer frame to project on a tilt; means for driving said inner frame outwardly; and means for driving said outer frame outwardly ahead of said inner frame.

4. In a mechanized warehousing system, a vertically movable carriage for moving loads to different storage levels; a load transferring extractor mounted to said carriage for projecting horizontally outwardly from said carriage; said extractor comprising inner and outer, relatively movable frames; first guide means carried by said carriage; first guide follower means carried by said inner frame and engaging said first guide means; second guide means carried by said inner frame; second guide follower means carried by said outer frame and engaging said second guide means; said second guide follower means having relatively upwardly and downwardly displaced guide surface portions engaging said second guide means and causing said outer frame to tilt upwardly at its forward end as it projects outwardly; means for driving said inner frame outwardly; and means for driving said outer frame outwardly ahead of said inner frame.

5. In a mechanized warehousing system, a vertically movable carriage for moving loads to different storage levels; a load transferring extractor mounted to said carriage for projecting horizontally outwardly from said carriage; said extractor comprising inner and outer, relatively movable frames; first guide means carried by said carriage; first guide follower means carried by said inner frame and engaging said first guide means; second guide means carried by said inner frame; second guide follower means carried by said outer frame and engaging said second guide means; said first and second guide follower means having relatively upwardly and downwardly displaced guide surface portions engaging said first and second guide means, respectively, and causing both said frames to tilt upwardly at their forward ends as they project outwardly, said outer frame tilting with respect to said inner frame; means for driving said inner frame outwardly; and means for driving said outer frame outwardly ahead of said inner frame.

6. In a mechanized warehousing system, a vertically movable carriage for moving loads to different storage levels; a load transferring extractor mounted to said carriage for projecting horizontally outwardly in opposite directions from said carriage; said extractor comprising an inner, horizontal frame and a superposed outer, horizontal frame; parallel first rows of rollers mounted upon said carriage below said inner frame; channel-shaped, elongated first guide members nested over said first rows of rollers and carried by said inner frame; parallel second rows of rollers fixedly mounted with respect to said inner frame; channel-shaped, elongated second guide members nested over said second rows of rollers and carried by said outer frame; said first guide members being bowed with their ends raised in side elevation and the rollers of said first rows of rollers being correspondingly positioned to ride in said first guide members whereby said inner frame is caused to tilt upwardly at its leading edge as it moves outwardly of said carriage in either direction, thereby tilting said outer frame the same amount; means for driving said inner frame outwardly; and means for driving said outer frame outwardly ahead of said inner frame.

7. In a mechanized warehousing system, a vertically movable carriage for moving loads to different storage levels; a load transferring extractor mounted to said carriage for projecting horizontally outwardly from said carriage; said extractor comprising an inner, horizontal frame and a superposed outer, horizontal frame; parallel first rows of rollers mounted upon said carriage below said inner frame; channel-shaped, elongated first guide members nested over said first rows of rollers and carried by said inner frame; parallel second rows of rollers fixedly mounted with respect to said inner frame; channel-shaped, elongated second guide members nested over said second rows of rollers and carried by said outer frame; said guide members being bent upwardly from the middle thereof whereby their ends are raised in side elevation and the rollers of each said row of rollers being correspondingly positioned to ride in said guide members whereby said inner frame is caused to tilt upwardly at its leading edge as it moves outwardly and said outer frame is caused to tilt upwardly with respect to said inner frame; means for driving said inner frame outwardly; and means for driving said outer frame outwardly ahead of said inner frame.

8. In a mechanized warehousing system, a vertically movable carriage for moving loads to different storage levels; a load transferring extractor mounted to said carriage for projecting horizontally outwardly from said carriage; said extractor comprising an inner, horizontal frame and a superposed outer, horizontal frame; a pair of parallel, spaced, inner rows of rollers mounted upon said carriage below said inner frame; a pair of channel-shaped, elongated first guide members nested over said pair of inner rows of rollers, respectively, and carried by said inner frame; a pair of parallel, spaced, outer rows of rollers mounted upon said pair of first guide members, respectively; a pair of idler pinion means mounted upon said pair of first guide members, respectively; a pair of channel-shaped, elongated second guide members nested over said pair of outer rows of rollers, respectively and carried by said outer frame; a first pair of racks carried by said carriage in mesh with said pair of pinion means, respectively; a second pair of racks carried by said outer frame in mesh with said pair of pinion means, respectively; said first guide members having guide surface portions which are upwardly turned from the mid-portion of said first guide members, in the direction of the ends thereof, and the rollers disposed beyond the mid-portions of each said inner row of rollers being correspondingly raised with respect to the remaining rollers in the same row whereby said inner frame is caused to tilt upwardly at its leading edge as it moves outwardly, thereby tilting said outer frame in the same direction; said first pair of racks being upwardly turned in the directions of their ends to the same extent as said guide surface portions; and means for driving said inner frame outwardly of said carriage whereby said outer frame is driven outwardly ahead of said inner frame.

9. In a mechanized warehousing system as set forth in claim 8; said means for driving said inner frame comprising a rack carried by said inner frame and drive pinion means carried by said carriage; said last mentioned rack having an engaging surface which is upwardly turned in the directions of its ends to substantially the same extent as said guide surface portions of said first guide members.

10. In a mechanized warehousing system as set forth in claim 9; said second guide members having guide surface portions which are upwardly turned from the mid-portion of said second guide members in the directions of the ends thereof and the rollers disposed beyond the mid-portion of each said outer row of rollers being correspondingly raised with respect to the remaining rollers in the same row whereby said outer frame is caused to tilt upwardly at its leading edge with respect to said inner frame as it moves outwardly; said second pair of racks being upwardly turned in the directions of their ends substantially to the same extent as said guide surface portions of said second guide members.

11. In a mechanized warehousing system, a vertically movable carriage for moving loads to different storage levels; a load transferring extractor mounted to said carriage for projecting horizontally outwardly in opposite directions from said carriage; said extractor comprising relatively movable frames; first interfitting guide means connecting said carriage with a first of said frames; second interfitting guide means connecting said first frame with a second of said frames; means for driving said first frame outwardly in opposite directions; means for driving said second frame outwardly in either of said directions ahead of said first frame; and one of said guide means having upwardly turned surface portions causing one of said first and second frames to tilt upwardly as it projects outwardly.

12. In a mechanized warehousing system, a vertically movable carriage for moving loads to different storage levels; a load transferring extractor mounted to said carriage for projecting horizontally outwardly in opposite directions from said carriage; said extractor comprising a frame; interfitting guide means connecting said carriage with said frame; means for driving said frame horizontally outwardly in opposite directions; said guide means having relatively upwardly and downwardly displaced surface portions displaced upwardly in either of said opposite directions and causing said frame to tilt upwardly as it projects outwardly in either of said opposite directions.

13. In a mechanized warehousing system, a vertically movable carriage for moving loads to different storage levels; a load transferring extractor mounted to said carriage for projecting horizontally outwardly in opposite direction from said carriage; said extractor comprising a horizontally movable frame; parallel rows of rollers mounted upon said carriage and disposed in the direction of movement of said extractor; channel-shaped, elongated guide members nested over said rows of rollers and carried by said frame; said guide members being bowed with their ends raised in side elevation and said rollers being correspondingly positioned to ride in said guide members whereby said frame is caused to tilt upwardly at its leading edge as it moves outwardly of said carriage in either direction; and means for driving said frame outwardly.

14. In a mechanized warehousing system, a vertically movable carriage for moving loads to different storage levels; a load transferring extractor mounted to said carriage for projecting horizontally outwardly in opposite directions from said carriage; said extractor comprising a horizontally movable frame; parallel rows of rollers mounted upon said frame and disposed in the direction of movement of said extractor; channel-shaped, elongated guide members nested over said rows of rollers and carried by said carriage; said guide members being bowed with their ends raised in side elevation and said rollers being correspondingly positioned to ride in said guide members whereby said frame is caused to tilt upwardly at its leading edge as it moves outwardly of said carriage in either direction; and means for driving said frame outwardly.

15. In a mechanized warehousing system, a vertically movable carriage for moving loads to different storage levels; a load transferring extractor mounted to said carriage for projecting horizontally in a load carrying path outwardly from said carriage; said extractor comprising a frame for receiving said load; interfitting guide means connecting said carriage with said frame; means for driving said frame outwardly cantilevered with respect to said carriage; said guide means having upwardly turned surface portions extending parallel to said path and causing said frame to tilt upwardly as it projects outwardly, whereby said upward tilt at least partially counteracts the tendency of said cantilevered frame to settle downwardly.

16. In a mechanized warehousing system, the combination as defined in claim 15 wherein said guide means is fixedly carried with respect to said carriage; guide follower means fixedly carried with respect to said frame; one of said guide and follower means having relatively upwardly and downwardly displaced surface portions displaced upwardly in said horizontal direction and causing said frame to tilt upwardly as it projects outwardly.

References Cited by the Examiner
UNITED STATES PATENTS
3,159,293  1/1964  Bianca _____ 214—16.1

GERALD M. FORLENZA, *Primary Examiner.*

R. B. JOHNSON, *Assistant Examiner.*